(12) United States Patent
Kardel

(10) Patent No.: US 12,536,919 B1
(45) Date of Patent: Jan. 27, 2026

(54) MUSICAL NOTE VALUE PIE

(71) Applicant: Dagmar Kardel, Southwest Ranches, FL (US)

(72) Inventor: Dagmar Kardel, Southwest Ranches, FL (US)

( * ) Notice: Subject to any disclaimer, the term of this patent is extended or adjusted under 35 U.S.C. 154(b) by 0 days.

(21) Appl. No.: 19/220,528

(22) Filed: May 28, 2025

(51) Int. Cl.
*G09B 15/02* (2006.01)
*G10G 1/00* (2006.01)
*G09B 3/02* (2006.01)

(52) U.S. Cl.
CPC ............ *G09B 15/026* (2013.01); *G10G 1/00* (2013.01); *G09B 3/02* (2013.01)

(58) Field of Classification Search
CPC ............ G09B 5/026; G09B 3/02; G10G 1/00
See application file for complete search history.

(56) References Cited

U.S. PATENT DOCUMENTS

| | | | | |
|---|---|---|---|---|
| 1,319,919 A * | 10/1919 | Barker | ................ | G09B 15/026 84/484 |
| 2,164,873 A * | 7/1939 | Everson | ............... | G09B 15/026 84/471 R |
| 6,588,756 B1 * | 7/2003 | Hughes | ................... | A63F 1/04 273/299 |
| 6,967,274 B2 * | 11/2005 | Hanington | ............. | G09B 15/02 84/484 |
| 7,709,721 B2 * | 5/2010 | Suganuma | ............... | G09B 7/00 84/476 |
| 8,188,356 B2 * | 5/2012 | Rose | ...................... | G09B 15/02 84/447 |
| 9,728,099 B2 * | 8/2017 | Armstrong | .......... | G09B 15/023 |
| 10,559,219 B1 * | 2/2020 | Davies | ................. | G09B 15/023 |
| 2009/0142738 A1 * | 6/2009 | Suganuma | .......... | G09B 19/025 434/191 |
| 2010/0288105 A1 * | 11/2010 | Rose | .................... | G09B 21/003 84/483.2 |
| 2022/0165175 A1 * | 5/2022 | Pickett | ..................... | G09B 1/04 |

\* cited by examiner

*Primary Examiner* — Robert W Horn

(57) ABSTRACT

A musical note value pie to show the mathematical relationship of basic musical notes among each other in reference to time duration of rhythm that includes a plurality of pie shaped segments of different colors representing different musical note values and a plurality of flash cards for teaching different note values, each of the flash cards being a different color commensurate with the note value represented.

3 Claims, 5 Drawing Sheets

FIG. 4
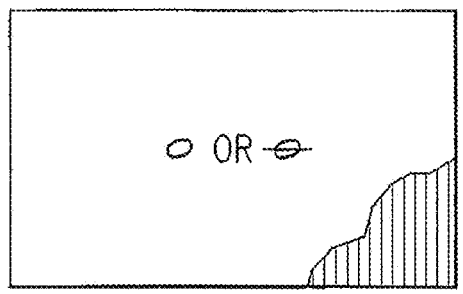
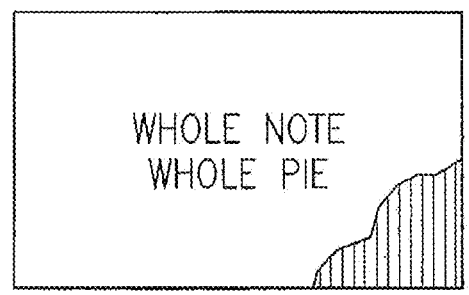
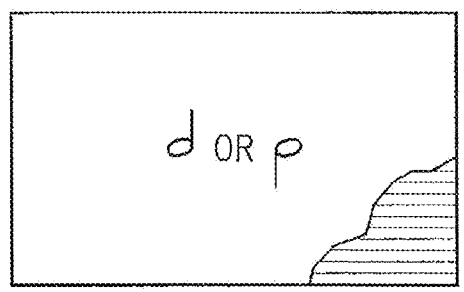
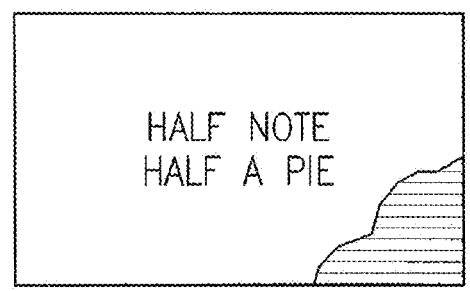
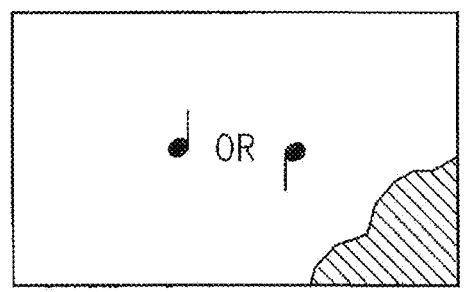
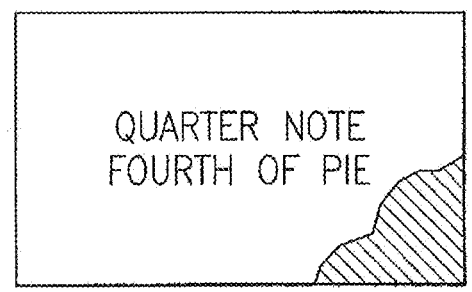
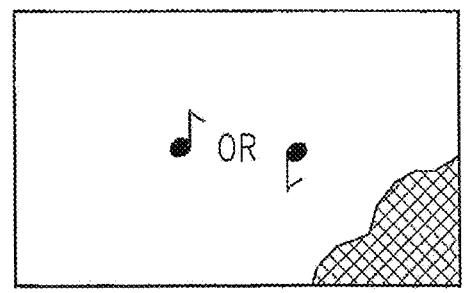
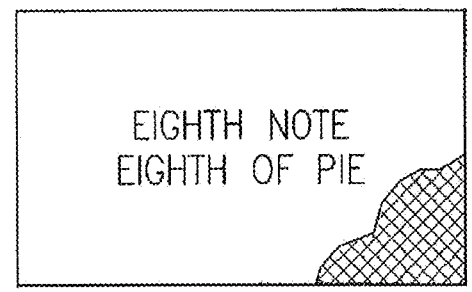
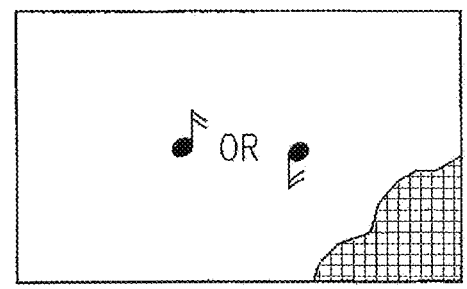
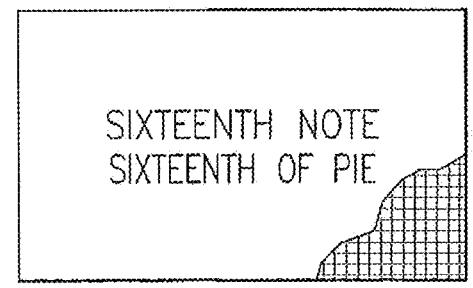

FIG. 5
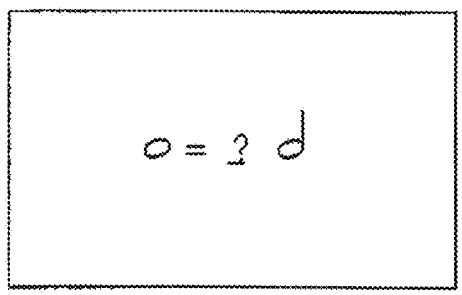
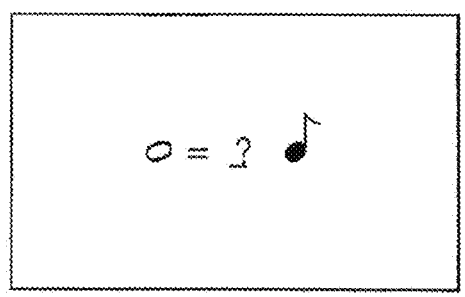
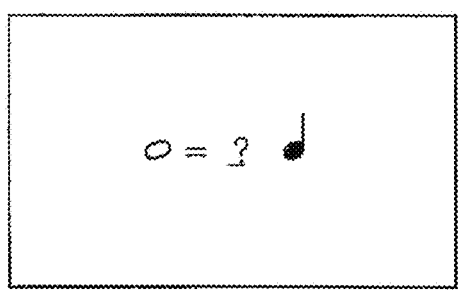
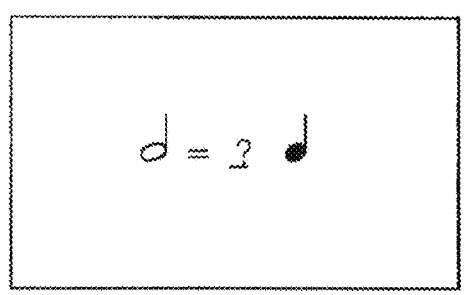
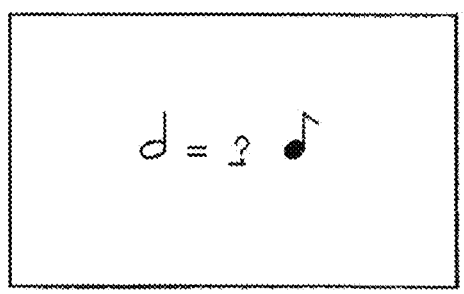
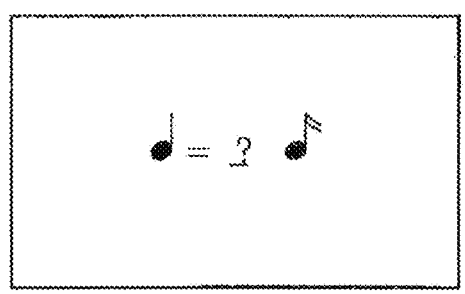
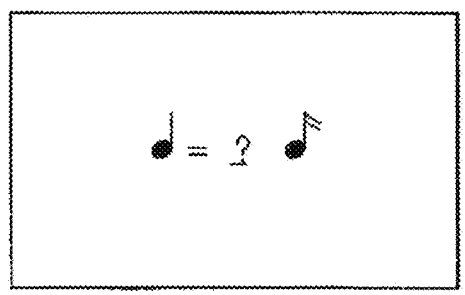
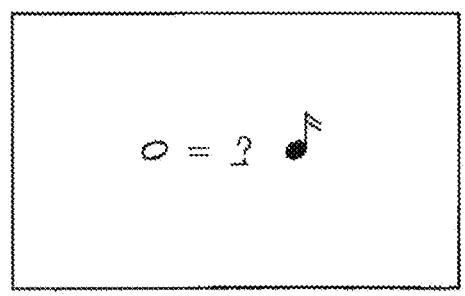
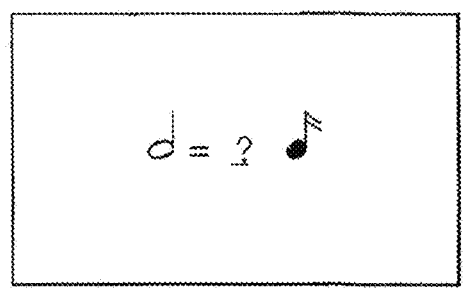
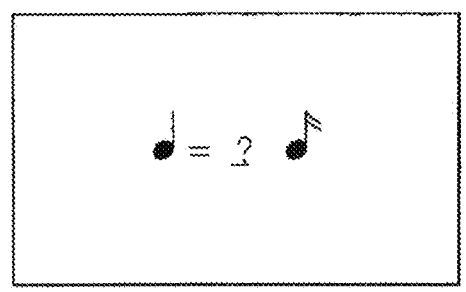

MUSICAL NOTE VALUE PIE

FIELD OF INVENTION

This invention relates to a teaching aid for music students to show the mathematical relationship of the basic musical notes among each other in reference to time duration (rhythm).

BACKGROUND

Musical notation includes a type of systematical, musical notes that are placed on a staff to relate to a specific note to be played on an instrument or for singing. The current musical notation used in sheet music was developed centuries ago long before of the invention of acoustic recording devices. It was then the only way to preserve and reproduce the fleeting acoustic creation that we call "music." To this day, this kind of shorthand for music makes it possible to recreate the music accurately at any time by anyone who can read the musical notation all over the world in a universal sense that can also reproduce sounds that were written centuries ago by famous classical composers.

While in the past, a live presentation of music was limited to comparatively few gifted people, in today's modern society, the demand for musical education and request to learn musical instruments has spread out to a much larger population. However, there is rarely anyone who is able to replay music accurately by just hearing the music. The vast majority of musicians have to rely on "reading" a sheet of music that contains musical notations.

There are two aspects to notation that must be realized:
1. The rise and fall of the note symbols among the five horizontally even spaced lines called "staff indicate a direct relationship to the pitch of the music and the notes and use alphabetical names for identification from "A" through "G" or "dor" "oter" "mir" "far" "osor" "lar" "ti." The pitch variations are logical and easy to understand and numerous teaching aids have been developed to give even very young children pre-reading age access to evaluating pitch.
2. The different shapes of the note symbols refer to rhythm or timing of the music. The note values are considered "whole notes," "half notes," "quarter notes," "eighth notes," "sixteenth notes," which refers to an absolute mathematical relationship between different notes and their symbols to equate a time relativeness between the notes. The rhythm or timing of the music and the note shapes are much more abstract because there is no "objective" feeling for time. A person verbally counts out loud "one thousand one" to denote the time one second to give an idea of the time that has elapsed.

Musical timing is extremely important because only if the rhythm is presented accurately can one fully enjoy the musical performance. Flaws in this aspect of music make the listening public uneasy.

For anyone teaching music, the biggest challenge is to make the students understand and absorb the mathematical correctness of rhythm (timing of the sound), but so far our research has not found any teaching aid for rhythm and timing. Most of the teaching of rhythm and timing consists of demonstration and copying which is a poor teaching aid because it requires constant assistance by teachers or skilled musicians.

The teaching aid described in the invention herein successfully uses a circular form with a plurality of pieces that can be described as a "pie." The "pie" is cut into ½, ¼, ⅛, 1/16 pieces which refer directly to the same note value showing the student their correct relationship among each other. The music educational aid described herein allows students to learn at each student's own pace and tempo, because each student can understand the system and is not bound by a certain demonstration of tempo. In addition to having a plurality of pieces and segments that are assembled as a note value pie, the music educational device described herein also includes quiz cards of different colors with flash cards for helping with the identification. With the present teaching aid described herein, anyone who can count up to sixteen can learn the basic rhythms and timing of music notation accurately without listening to demonstrations or recordings.

SUMMARY

A musical teaching aid comprising a plurality of stackable pie shaped elements, each set of elements representing a different value and containing a different number of pieces of pie segments that fits within an adjacent pie segment.

The first two pie segments form the top and bottom of the teaching aid and are basically circular discs with an annular lip perpendicular to the disc with the top solid representing a complete 360° circle and a whole note. The top disc and the bottom disc have different diameters so that they can fit together such that the top disc will fit inside the diameter of the bottom disc so that the entire teaching aid can be held together by the top and bottom discs.

Starting from the top, a second pie shaped element or segment will include two 180° pie shaped cuts of a diameter slightly smaller than the top disc. The two 180° pie shaped segments represent each a half note. These elements can be a specific color such as blue. The top and bottom discs can be colored red. The third disc, which will also fit inside the second disc, will be made up of four pic shaped segments of 90° each. This will represent 4 quarter notes and will be the color green.

The next pie shaped elements will be a disc that is cut into eight pie segments of 45° each and is colored orange. Note that the fourth disc, which represents eighth notes, fits inside the third disc, which represents quarter notes, which fits inside the second disc, which represents half notes.

Finally, although it could go on to even greater segments, the fifth disc is cut into sixteen equally sized segments of 22.5° each. The fifth disc represents sixteenth notes and may be yellow in color. Thus, as far as the values of the specific pie shaped segments, there can be a pic shaped segment that represents a specific rhythm value of a note such as a whole note, a half note, a quarter note, an eighth note and a sixteenth note, all of which can fit together in a single unit that can be taken apart so the student can compare the visual values provided by the sizes and shapes of the pie shaped elements. In addition to the specific physical pie shaped elements, the teaching aid will include flash cards that are colored according to each pie segment. The front of the flash card shows the symbol associated with the particular notation of music. The card will be the color corresponding to the pic shaped segment. On the back of the flash card are the words "whole note", "half note," "quarter note," "eighth note" or "sixteenth note." The student observes the musical note value symbol such as a whole note or a half note, and compares the symbol with the color coded pie shaped segments. The student flips over the card to identify the specific note value in words.

The quiz cards are used to test the student's ability to recognize the notes and their time relationship among each other after learning it with the aid of the note value pie and the flash cards.

It is an object of this invention to provide a teaching aid for music students to learn at their own pace, to accurately recreate the time value of music (rhythm), by understanding the mathematical relationship of the note values among each other.

Another object of this invention is to provide a teaching system for rhythm and music notation, that includes using pie shaped segments as a teaching aid along with quiz cards and flash cards.

Accordingly, the invention features a musical note value pie device for use as a training aid for visually teaching rhythm and timing in music. The device includes a cylindrical whole shaped base having an annular lip disposed around it, a pair of semicircular segments having a diameter that is less than a diameter of the base so that the semicircular segments fit inside the base diameter, and a top base cover that is a complete cylindrical body having a lip portion, the outside diameter of which is less than the inside diameter. The device also includes a plurality of flash cards, each card having a musical symbol on one side and a word spelled out of what the note is, such as "whole note," each of said cards being a color in each of said pie shaped segments representing different colors for different note values.

In another aspect, the invention can feature a plurality of quiz cards having timing value questions to be answered by the student based on the symbols of the notes.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions, will control.

In accordance with these and other objects, which will become apparent hereinafter, the instant invention will now be described with particular reference to the accompanying drawings.

BRIEF DESCRIPTION OF THE DRAWINGS

FIG. 4 shows flash cards denoting musical notation used as a teaching aid.

FIG. 5 shows an example of quiz cards.

DETAILED DESCRIPTION

Figure 1:
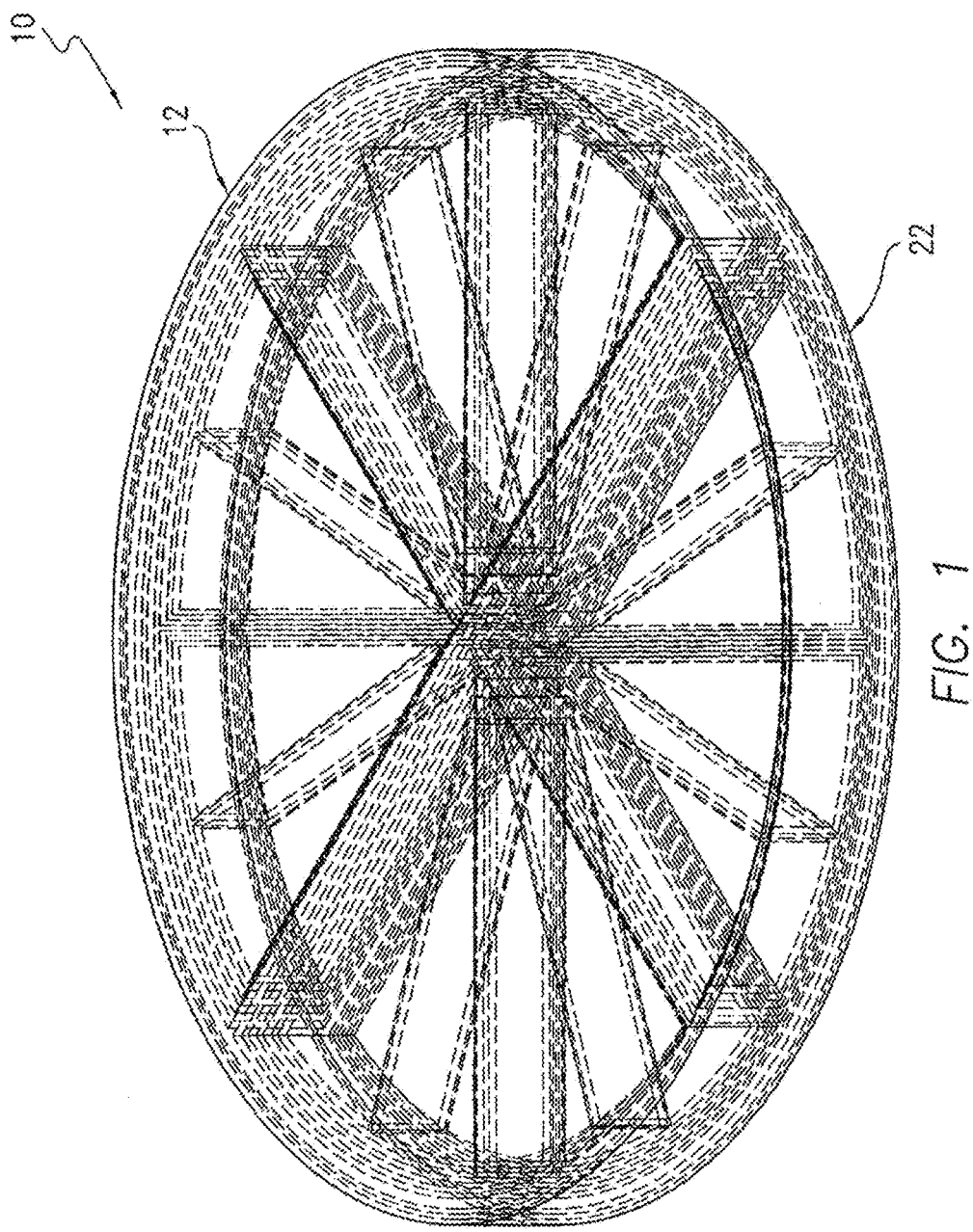
FIG. 1 shows a perspective view of the teaching aid used in the present invention in phantom with the pieces enclosed.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather, should be read as "and/or" unless expressly stated otherwise. Similarly, a group of items linked with the conjunction "or" should not be read as requiring mutual exclusivity among that group, but rather, should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Referring now to the drawings and, in particular, FIG. 1, the teaching aid "musical note value pie" is shown generally at 10 which includes a top cylindrical cover 12 that also functions as the visual representation of a whole note and would typically be colored in a specific color such as red. The teaching aid also includes a cylindrical base 22 that has an outside diameter slightly less than the inside diameter of cover 12 so that the entire teaching aid with all of its subcomponent pieces fits snuggly in an enclosure as shown in FIG. 1. The 20 phantom lines in FIG. 1 represent the contents of the enclosure beneath cover 12 and within the base enclosure 22.

Figure 2:
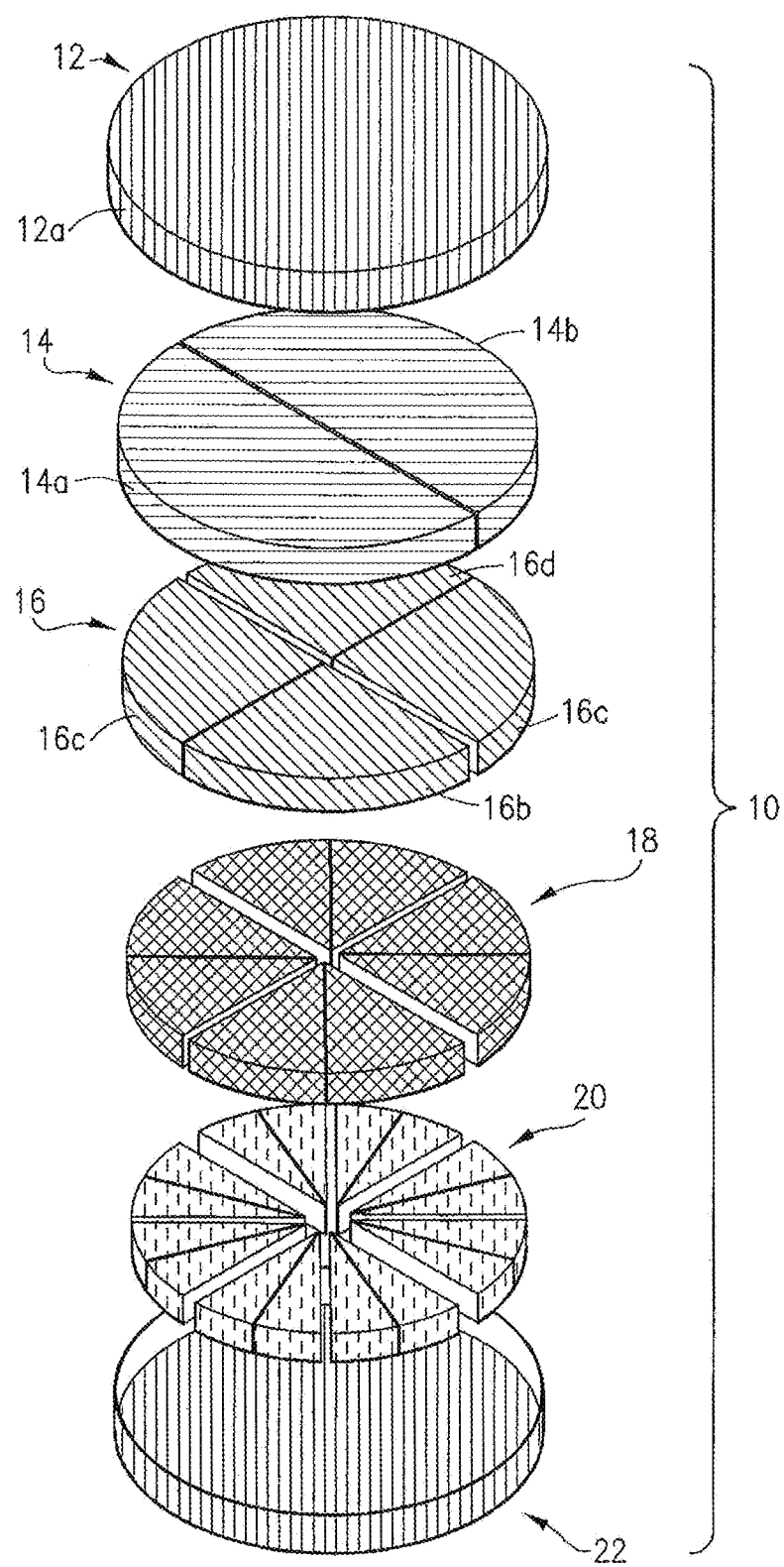
FIG. 2 shows a perspective view of the pie shaped segment teaching aid device used with the present invention in a perspective exploded view.

Referring now to FIG. 2, the teaching aid 10 is shown comprised of multiple subcomponents in an exploded view. The top cylinder subcomponent which is also the cover 12 for the device is a complete circular enclosure with a lip 12a that also functions to represent visually a whole note in music. Positioned directly below the whole note representation 12 are two semicircular cylindrical sections 14 which may also be a specific color such as blue. The outside diameter of the half note 14 representations is slightly smaller than the inside diameter of the whole note 12. But the approximations are such that two half sections 14a and 14b visually represent half notes as compared with the whole note 12.

Positioned directly below the half note representation device 14 are four 90° pic segments 16a, 16b, 16c and 16d, which are colored a different color such as green. The four sections together represent an entire circular disk and the outside diameter of the entire disk is slightly less than the inside diameter of the half note representations 14 and fit inside there. The quarter segments or one fourth pie segments represent quarter notes and can visually be compared with the half note segments 14 and the whole note 12. Visually and in aerial space can be seen that the quarter notes 16 representation equals four sub-pie sections and that also equals the same area as the half note segments 14.

Positioned below the quarter note symbolic representations 16 is a circular group of eight segments that are in 45° angles, in which eight of the pie shaped segments equal the entire circle. These represent eighth notes and they are a separate color such as orange.

Positioned below segments 18 are sixteen segments which are in 22.5° angles 20 that make up sixteenth notes and they are colored a different color yellow. Note that the outside diameter of the pie shaped segments 20 is slightly less than the inside diameter of the pie segments 18. When looking at FIG. 2, all of the pie shaped segments that represent all of the different notes starting with the whole note at the top, the half notes, the quarter notes, the eighth notes and the sixteenth notes, because of the differences in the inside and outside diameters with adjacent pieces, would all fit together to a single enclosure into base 22, which is red, and which is covered by cover 12 which is a whole note representation.

Figure 3:
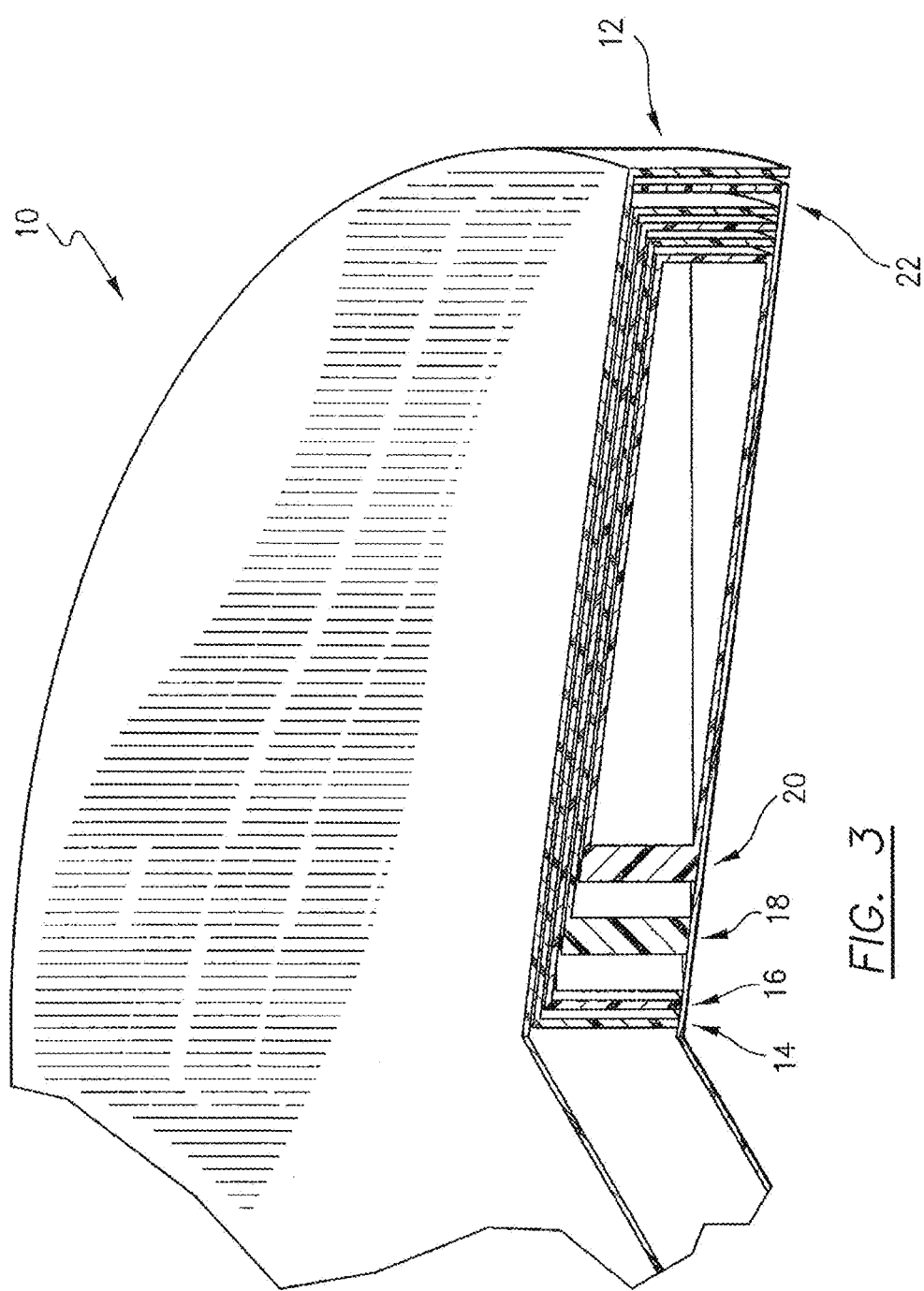
FIG. 3 shows a perspective side elevational cut away view of the present invention and its stacked relationship in non-use.

Referring to FIG. 3, it shows the device partially cut away with each of the segments contained in the enclosure with cover 12 covering the base 22. Each of the additional pic shaped segment would all fit together in the enclosure 12.

In use, the student will use all of the segments shown in FIG. 2 in conjunction with flash cards and quiz cards.

Referring now to FIG. 4, plurality of representations for flash cards which are each colored according to the pie shaped segment is shown. For example, on the front of the flash card colored red is a symbol of a whole note, while on the back of the same card, it will be written "whole note," "whole pic." The example continues with another flash card which would have the symbol for a half note on one side of the card and on the back of the card, it will say the words "half note" or "half a pic" and the card color will be blue. With respect to the flash card for the quarter note, on the back side would say the words "quarter note" or "fourth of pie" and it is colored green.

The flash cards also include symbols on one side with eighth notes and sixteenth notes and on the back side the word "eighth note," "eighth of a pie," "sixteenth note," "sixteenth of a pic," each of the cards is also the corresponding color to the pie shaped segments.

For additional training, quiz cards can be used which have puzzles that have to be answered verbally. They show the symbol of the note and equal sign (as shown in FIG. 5) and then another symbol of a note so that with the question mark, the student must fill in the actual number represented. For example in FIG. 5 on line 1, there is a whole note shown that equals question mark and the symbol of a half note is shown. So the answer to the first quiz card puzzle would be two. Additional flash cards could be made available for quiz cards that use dotted notes that increase the timing differential of the system.

For use as a teaching aid, the student can disassemble the pie structure shown in FIG. 2 into its various segments that represent different notes. The student then can visually compare the four quarter notes with two half notes, one whole note and so on. At the same time, the student can use the flash cards to understand the symbols of whole notes and all the other notes required in the timing and the representation by their colors to the segments shown in the pie shaped of the musical note value pie.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A musical note value pie device for use as a training aid for visually teaching rhythm and timing in music comprising: a cylindrical whole shaped base comprising an annular lip disposed around it; a pair of semicircular segments comprising a diameter that is less than a diameter of the base so that the semicircular segments fit inside the base diameter; a top base cover that is a complete cylindrical body comprising a lip portion, the outside diameter of which is less than the inside diameter; and a plurality of flash cards, each card comprising a musical symbol on one side and a word spelled out of what the note duration is, such as "whole note," each of said cards being a color in each of said pie shaped segments representing different colors for different note values.

2. The device as in of claim 1, including: a plurality of quiz cards comprising timing value questions to be answered by the student based on the symbols of the notes.

3. The device of claim 1, the note durations including: whole note, half note, quarter note and eighth note, or any other duration.

\* \* \* \* \*